(12) United States Patent
Ataie

(10) Patent No.: US 11,137,627 B2
(45) Date of Patent: Oct. 5, 2021

(54) METHODS FOR COMPUTATION-FREE WIDEBAND SPECTRAL CORRELATION AND ANALYSIS

(71) Applicant: RAM Photonics, LLC, San Diego, CA (US)

(72) Inventor: Vahid Ataie, San Diego, CA (US)

(73) Assignee: RAM Photonics, LLC, San Diego, CA (US)

( * ) Notice: Subject to any disclaimer, the term of this patent is extended or adjusted under 35 U.S.C. 154(b) by 318 days.

(21) Appl. No.: 16/236,038

(22) Filed: Dec. 28, 2018

(65) Prior Publication Data

US 2019/0339548 A1 Nov. 7, 2019

Related U.S. Application Data

(60) Provisional application No. 62/666,363, filed on May 3, 2018.

(51) Int. Cl.
*H04B 10/079* (2013.01)
*G02F 1/01* (2006.01)
(Continued)

(52) U.S. Cl.
CPC ....... *G02F 1/0102* (2013.01); *G01B 9/02002* (2013.01); *G02F 1/0121* (2013.01);
(Continued)

(58) Field of Classification Search
CPC ........ H04J 14/00; H04J 14/02; H04J 14/0227; G02F 1/0102; G02F 1/0121; G02F 2203/05; H04B 10/07; H04B 10/079
See application file for complete search history.

(56) References Cited

U.S. PATENT DOCUMENTS

| 8,026,837 B1 * | 9/2011 | Valley .................. H04B 10/676 341/137 |
| 9,287,993 B1 | 3/2016 | Adleman et al. |

(Continued)

FOREIGN PATENT DOCUMENTS

| GB | 2570213 A | 7/2019 |
| WO | 2012-121867 A1 | 9/2012 |

OTHER PUBLICATIONS

Search Report dated Nov. 6, 2020 in French Patent Application No. FR1904624, 8 pages.

(Continued)

*Primary Examiner* — Nathan M Cors
(74) *Attorney, Agent, or Firm* — Kilpatrick Townsend & Stockton, LLP

(57) ABSTRACT

An apparatus for generating a set of spectral correlation coefficients of an input signal includes: a master laser configured to generate an optical frequency comb signal; a first optical modulator configured to modulate the optical frequency comb signal with an input signal to generate a plurality of spectral copies of the input signal; a dispersive element configured to delay the plurality of spectral copies of the input signal by a wavelength-dependent time delay; a second optical modulator configured to modulate the delayed plurality of spectral copies with a conjugate of the input signal; and an optical comb filter configured to integrate the conjugate modulated plurality of spectral copies of the input signal to generate a set of cyclic autocorrelation coefficients.

17 Claims, 14 Drawing Sheets

(51) Int. Cl.
*H04J 14/00* (2006.01)
*G02F 1/133* (2006.01)
*H04B 1/711* (2011.01)
*G01B 9/02* (2006.01)

(52) U.S. Cl.
CPC ............ *G02F 1/133* (2013.01); *H04B 1/711* (2013.01); *H04J 14/00* (2013.01); *G02F 2203/05* (2013.01)

(56) References Cited

U.S. PATENT DOCUMENTS

| | | | | |
|---|---|---|---|---|
| 2005/0244154 | A1* | 11/2005 | Dinu | H04B 10/0795 398/33 |
| 2011/0064169 | A1* | 3/2011 | Li | H04B 10/6165 375/344 |
| 2013/0183041 | A1* | 7/2013 | Wan | H04B 10/2575 398/81 |
| 2018/0131445 | A1 | 5/2018 | Esman et al. | |

OTHER PUBLICATIONS

Ataie, V., et al., "Ultrafast absolute ranging by coherent parametric comb," 2013 Optical Fiber Communication Conference and Exposition and the National Fiber Optic Engineers Conference (OFC/NFOEC), Anaheim, CA, 2013, pp. 1-3, DOI:10.1364/OFC.2013.OTh3D.2.

Guan, P., et al., "Real-time all-optical OFDM transmission system based on time-domain optical fourier transformation," OFC 2014, San Francisco, CA, 2014, pp. 1-3, DOI:10.1364/OFC.2014.W4F.1.

Esman, D., et al., "Comb-Assisted Cyclostationary Analysis of Wideband RF Signals", Journal of Lightwave Technology, vol. 35, No. 17, DOI: 10.1109/JLT.2017.2715336, Sep. 1, 2017, p. 3712-3719.

Hillerkuss, D., et al. "Simple all-optical FFT scheme enabling Tbit/s real-time signal processing", Optics Express, vol. 18, No. 9, DOI:10.1364/OE.18.009324, Apr. 2010, p. 9324-9340.

* cited by examiner

METHODS FOR COMPUTATION-FREE WIDEBAND SPECTRAL CORRELATION AND ANALYSIS

CROSS-REFERENCES TO RELATED APPLICATIONS

This application claims the benefit of U.S. Provisional Application No. 62/666,363, filed May 3, 2018, the contents of which are hereby incorporated by reference in their entirety for all purposes.

BACKGROUND OF THE INVENTION

Techniques for wideband spectral correlation function and/or cyclic-autocorrelation function estimation have been developed. Despite the progress made in digital techniques for spectral correlation calculation that is done in digital electrical domain, the intensive computation required for wideband signal analysis is beyond state of the art electronics capability. There is a need in the art for improved methods and systems related to spectral correlation calculation.

SUMMARY OF THE INVENTION

In accordance with various aspects of the present disclosure, apparatuses and methods for computation-free or reduced computation wideband spectral correlation and analysis are provided.

According to various aspects, there is provided an apparatus for generating a set of cyclic autocorrelation coefficients of an input signal. In some aspects, the apparatus may include: a master laser configured to generate an optical frequency comb; a first optical modulator configured to modulate the optical frequency comb with an input signal to generate a plurality of spectral copies of the input signal; a dispersive element configured to delay the plurality of spectral copies of the input signal by a wavelength-dependent time delay; a second optical modulator configured to modulate the delayed plurality of spectral copies with a conjugate of the input signal; and an optical comb filter configured to integrate the conjugate modulated plurality of spectral copies of the input signal to generate the set of cyclic autocorrelation coefficients.

The apparatus may further include: a local oscillator configured to generate a swept frequency; a third optical modulator configured to modulate an optical signal generated by the master laser with the swept frequency from the local oscillator to generate swept optical sampling signals; a wavelength demultiplexer configured to combine the swept optical sampling signals and the integrated conjugate modulated delayed plurality of spectral copies of the input signal such that each of the swept optical sampling signals samples a corresponding integrated conjugate modulated delayed spectral copy of the input signal; and a plurality of detectors configured to detect the set of cyclic autocorrelation coefficients for all time delays of an associated tone from the integrated conjugate modulated delayed spectral copies of the input signal, and output the detected cyclic autocorrelation coefficients.

According to various aspects, there is provided a method for generating a set of cyclic autocorrelation coefficients of an input signal. In some aspects, the method may include: generating an optical frequency comb signal from a master laser optical signal; generating a plurality of spectral copies of the input signal by modulating the optical frequency comb signal with the input signal; delaying the plurality of spectral copies by a wavelength-dependent time delay; modulating the delayed plurality of spectral copies with a conjugate of the input signal; and generating the set of cyclic autocorrelation coefficients by integrating the conjugate modulated delayed plurality of spectral copies of the input signal.

The method may further include: generating a swept frequency; modulating an optical signal from the master laser with the swept frequency to generate swept optical sampling signals; combining the swept optical sampling signals and the integrated conjugate modulated delayed plurality of spectral copies of the input signal such that each of the swept optical sampling signals samples a corresponding integrated conjugate modulated delayed spectral copy of the input signal; detecting the set of cyclic autocorrelation coefficients for all time delays of an associated tone from the integrated conjugate modulated delayed spectral copies of the input signal; and outputting the detected cyclic autocorrelation coefficients.

According to various aspects, there is provided an apparatus for generating coefficients for a Wigner function in an optical domain. In some aspects, the apparatus may include: a master laser configured to generate an optical frequency comb signal; a first optical modulator configured to modulate the optical frequency comb signal with a first signal to generate a plurality of spectral copies of the first signal; a dispersive element configured to delay the plurality of spectral copies of the first signal by a wavelength-dependent time delay; a second optical modulator configured to modulate the delayed plurality of spectral copies with a second signal; and an optical comb filter configured to integrate the modulated delayed plurality of spectral copies of the first signal to generate a set of Wigner function coefficients.

The apparatus may further include: a local oscillator configured to generate a swept frequency; a third optical modulator configured to modulate an optical signal generated by the master laser with the swept frequency from the local oscillator to generate swept optical sampling signals; a wavelength demultiplexer configured to combine the swept optical sampling signals and the integrated modulated delayed plurality of spectral copies of the first signal such that each of the swept optical sampling signals samples a corresponding integrated modulated delayed spectral copy of the first signal; and a plurality of detectors configured to detect the set of Wigner function coefficients for all time delays of an associated tone from the integrated modulated delayed spectral copies of the first signal, and output the detected set of Wigner function coefficients.

According to various aspects, there is provided a method for generating a set of coefficients for a Wigner function in an optical domain. In some aspects, the method may include: generating an optical frequency comb signal from a master laser optical signal; generating a plurality of spectral copies of a first signal by modulating the optical frequency comb signal with the first signal; delaying the plurality of spectral copies by a wavelength-dependent time delay; modulating the delayed plurality of spectral copies with a second signal; and generating the set of coefficients for the Wigner function by integrating the delayed modulated plurality of spectral copies of the first signal.

In an embodiment, the optical frequency comb signal and the delayed plurality of spectral copies are amplitude modulated. In another embodiment, the second signal is a conjugate of the first signal and the Wigner function is a cyclic autocorrelation function. Additionally, the second signal can be a conjugate of a signal different from the first signal received from a same source as the first signal and the Wigner function can be a cross-ambiguity function.

The method may further include: generating a swept frequency; modulating an optical signal generated by the master laser with the swept frequency to generate swept optical sampling signals; combining the swept optical sampling signals and the integrated modulated delayed plurality of spectral copies of the first signal such that each of the swept optical sampling signals samples a corresponding integrated modulated delayed spectral copy of the first signal; detecting the set of coefficients for the Wigner function for all time delays of an associated tone from the integrated modulated delayed spectral copies of the first signal; and outputting the detected set of Wigner function coefficients. The optical signal generated by the master laser can be single side band modulated. Also, detecting the set of coefficients for the Wigner function can include coherent detection.

Numerous benefits are achieved by way of the various embodiments over conventional techniques. For example, the various embodiments provide methods and systems that can be used to circumvent basic limits imposed by the analog-to-digital converter (ADC) and repeated Fast-Fourier Transform (FFT) used in a conventional cyclostationary (CS) receiver. In some embodiments, radio frequency (RF) signal analysis may be performed in the optical domain, thereby eliminating the need for a high-speed ADC and requiring less processing power for computing FFTs. These and other embodiments along with many of its advantages and features are described in more detail in conjunction with the text below and attached figures.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete and will fully convey the full scope to those skilled in the art.

DETAILED DESCRIPTION OF SPECIFIC EMBODIMENTS

The present invention relates generally to wideband spectral correlation analysis, and in particular to computation-free or reduced computation wideband spectral correlation analysis. The architecture of the present disclosure was developed to circumvent basic limits imposed by the ADC and DFT in conventional CS receivers. Cyclostationary and high-order (cumulant) analysis is based on the fact that signals and noise have different correlation (moment) properties; however, to realize this, one does not necessarily need time-to-frequency mapping.

Spectral correlation has been used in signal detection, for example in telecommunications systems. The spectral correlation function of a cyclostationary process describes the cross-spectral density, or coherence, of all pairs of frequency-shifted versions of a time-series. Calculation of the spectral correlation causes the stochastic portion (i.e., noise) of the cyclostationary process to vanish while the deterministic portion having cyclic features emerges.

Cyclostationary and high-order (cumulant) analysis is based on a fact that signals and noise have different correlation (i.e., moment) properties. A modulation-bearing signal x(t) possesses a unique cyclic autocorrelation defined as the Fourier transform of a signal and its delayed copy as shown in equation (1):

$$R_x^\alpha(\tau) = \int_{-\infty}^{\infty} x\left(t - \frac{\tau}{2}\right) x^*\left(t + \frac{\tau}{2}\right) e^{-j2\pi\alpha t} dt \qquad (1)$$

One of ordinary skill in the art will recognize equation (1) as a Wigner function that approximates how the spectral density changes in time. The spectral correlation function is the Fourier counterpart of the cyclic autocorrelation $R_x^\alpha(\tau)$ as shown in equation (2):

$$S_x^\alpha(f) = \int_{-\infty}^{\infty} R_x^\alpha(\tau) e^{-j2\pi f \tau} d\tau \quad (2)$$

Rather than generating the cyclic autocorrelation function $R_x^\alpha(\tau)$, conventional cyclostationary (CS) receivers first map a discretized signal via discrete Fourier transform (DFT) as shown in equation (3):

$$X(n,k) = \sum_{r=-N/2+1}^{N/2} x(n-r) e^{\frac{-j2\pi k(n-r)}{N}} \quad (3)$$

and then produce the spectral correlation function $S_x^\alpha$ shown in equation (4) by populating a spectral product table:

$$S_x^\alpha(n,k) = \frac{1}{M} \sum_{n=0}^{M-1} \frac{1}{N} X\left(n, k + \frac{\alpha}{2}\right) X^*\left(n, k - \frac{\alpha}{2}\right) \quad (4)$$

The frequency of a signal that can be processed in this manner is computationally intensive and is limited by the bandwidth and resolution of the analog-to-digital converter (ADC) used to create the discrete signal as well as the processing speed for performing the repeated DFT and multiplications.

Figure 1A:
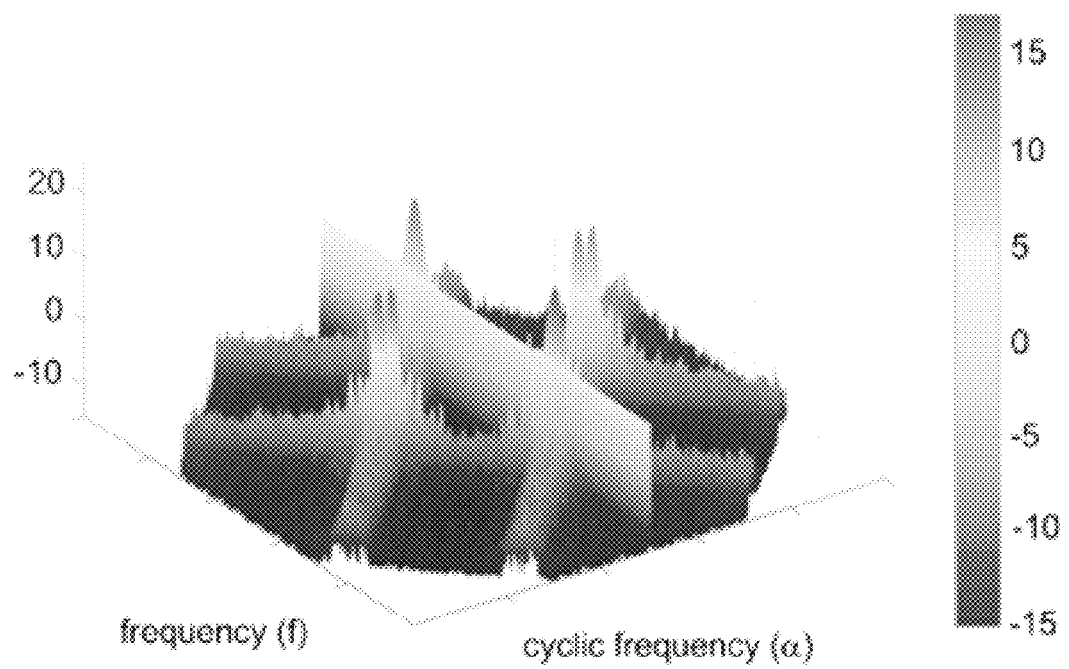
FIG. 1A is an illustration of a spectral correlation function $S_x^\alpha$ for a cyclostationary minimum shift keying (MSK) modulated signal having a signal-to-noise ratio (SNR) of 10 dB.
Figure 1B:
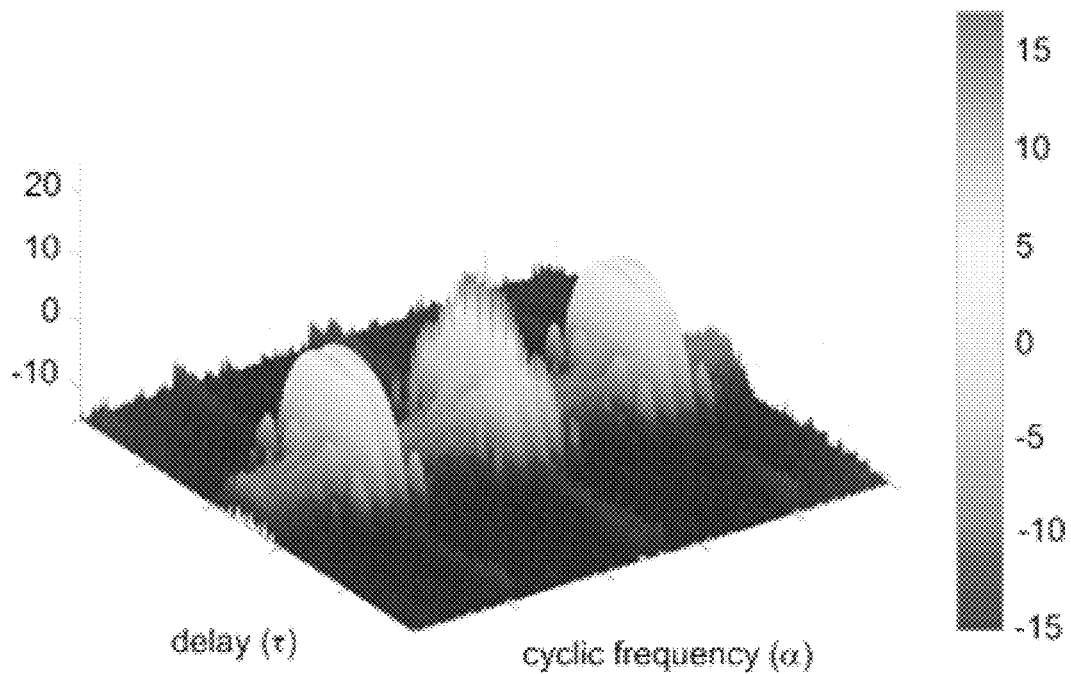
FIG. 1B is an illustration of the cyclic autocorrelation function $R_x^\alpha$ corresponding to the cyclostationary signal of FIG. 1A.
Figure 1C:
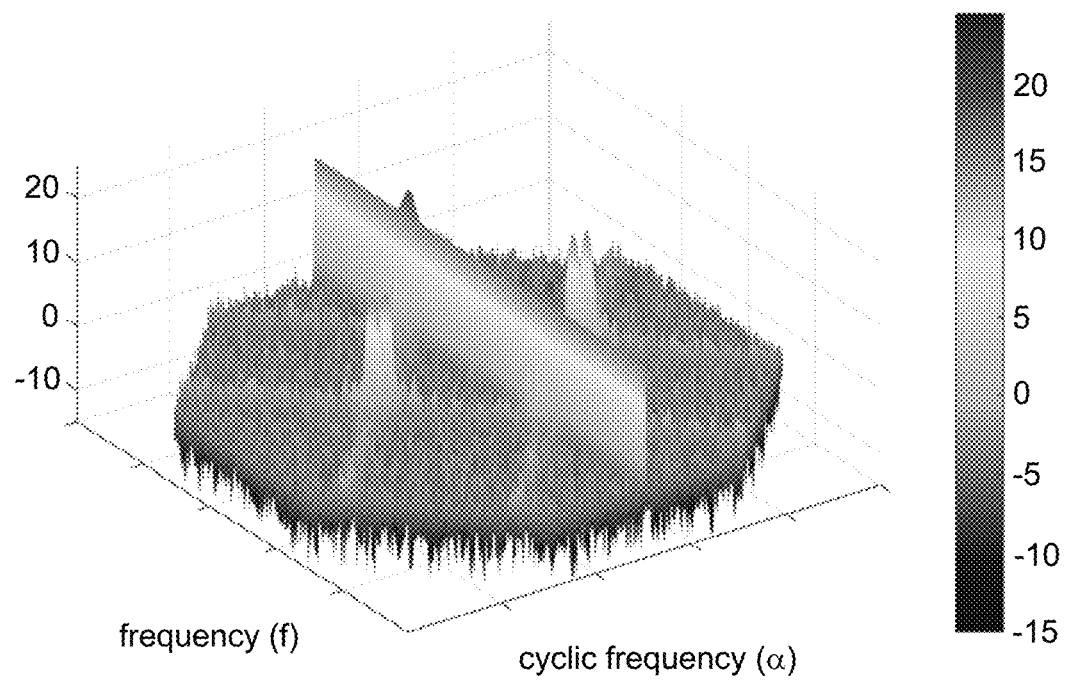
FIG. 1C is an illustration of a spectral correlation function $S_x^\alpha$ for a cyclostationary minimum shift keying (MSK) modulated signal having a signal-to-noise ratio (SNR) of 0 dB.
Figure 1D:
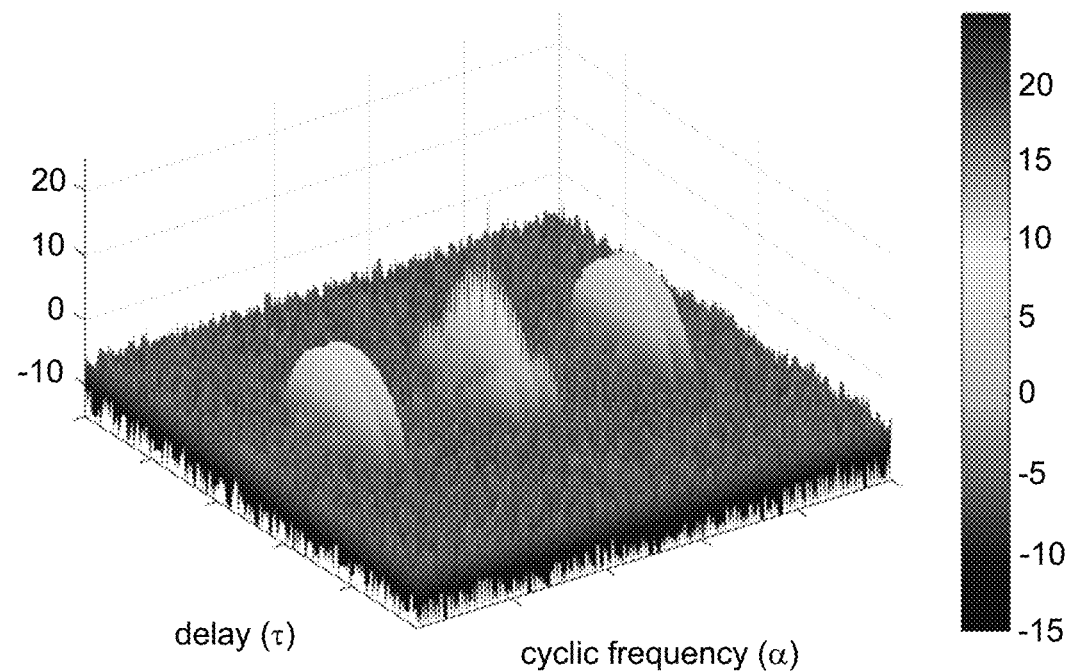
FIG. 1D is an illustration of the cyclic autocorrelation function $R_x^\alpha$ corresponding to the cyclostationary signal of FIG. 1C.

FIG. 1A is an illustration of an example of a spectral correlation function $S_x^\alpha$ for a cyclostationary minimum shift keying (MSK) modulated signal having a signal-to-noise ratio (SNR) of 10 dB. The signal has a 2 Gbps data rate and is upconverted at 8 GHz. FIG. 1B is an illustration of the cyclic autocorrelation function $R_x^\alpha$ corresponding to the cyclostationary signal of FIG. 1A. FIG. 1C is an illustration of an example of a spectral correlation function $S_x^\alpha$ for a cyclostationary minimum shift keying (MSK) modulated signal having a signal-to-noise ratio (SNR) of 0 dB. The signal has a 2 Gbps data rate and is upconverted at 8 GHz. FIG. 1D is an illustration of the cyclic autocorrelation function $R_x^\alpha$ corresponding to the cyclostationary signal of FIG. 1C. In FIGS. 1A and 1C the frequency (f) axis is scaled from −10 GHz to 10 GHz with f=0 at the center. Similarly the cyclic frequency axis (a) is scaled from 10 GHz to −10 GHz with α=0 at the center. In FIGS. 1B and 1D the time (i.e., delay) axis (τ) is scaled from τ=−1/f to τ=1/f with τ=0 at the center, and the cyclic frequency axis (a) is scaled from 10 GHz to −10 GHz with α=0 at the center.

Both the Spectral Correlation functions $S_x^\alpha$ in FIGS. 1A and 1C and the cyclic autocorrelation functions $R_x^\alpha$ in FIGS. 1B and 1D reveal unique modulation signatures by discriminating noise. FIGS. 1A-1D show the modulated signal buried in noise: $S_x^\alpha$ localizes noise along the ridge at α=0, while $R_x^\alpha$ confines the noise substantially to the center of the map at τ=0 and α=0. As can be seen in FIGS. 1A-1D, by comparing the spectral correlation function $S_x^\alpha$ and the cyclic autocorrelation function $R_x^\alpha$, if the cyclic autocorrelation function could be practically generated repeated time-to-frequency transforms would be unnecessary. Practical generation of the cyclic autocorrelation function may be accomplished by a photonic cyclic autocorrelation processor and may be a superior solution for noise-signal separation.

Figure 2:
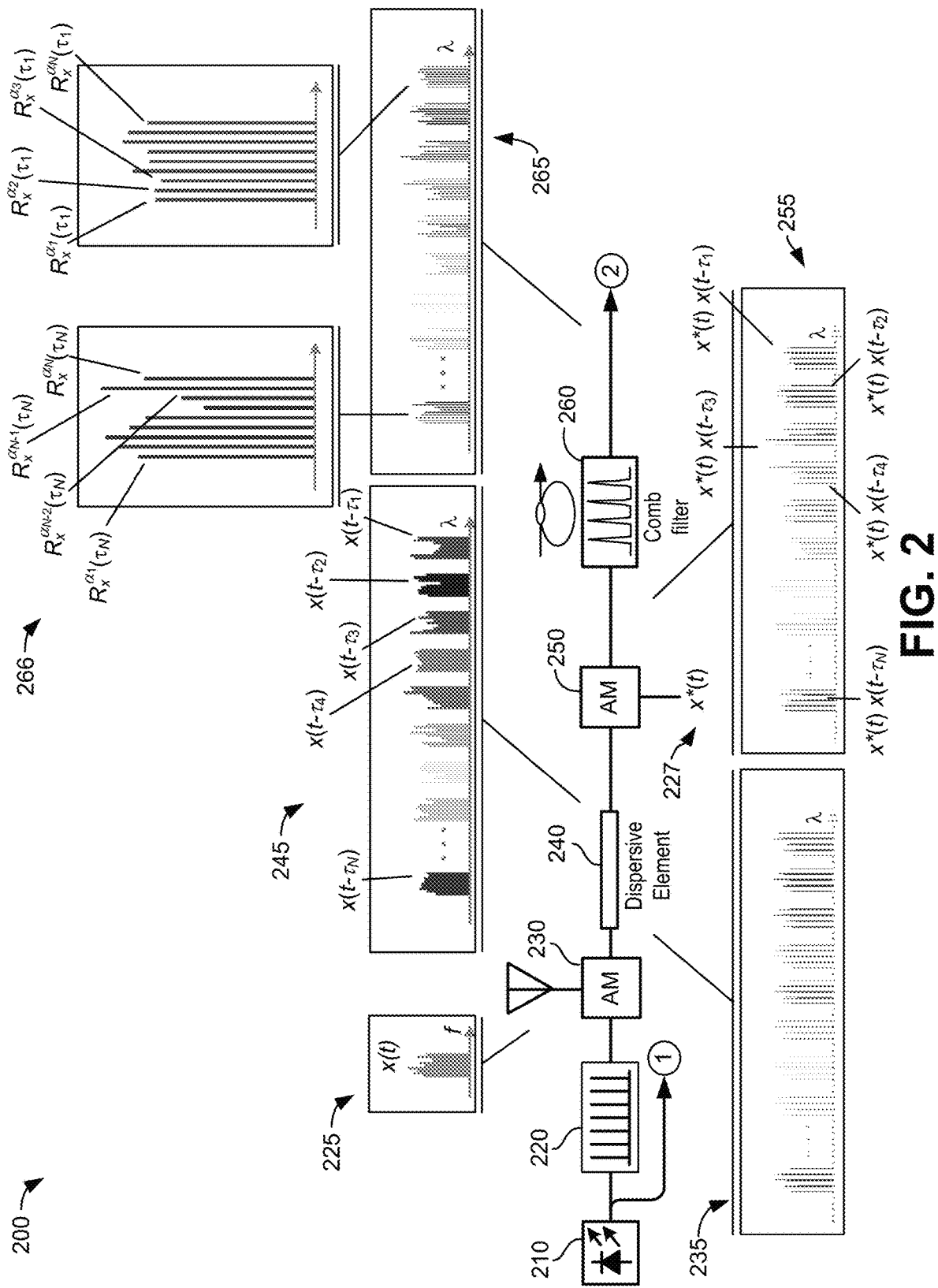
FIG. 2 is a block diagram of a photonic assisted cyclic autocorrelation processor in accordance with various aspects of the present disclosure.

FIG. 2 is a block diagram of a photonic assisted cyclic autocorrelation processor 200 in accordance with various aspects of the present disclosure. The photonic cyclic autocorrelation processor 200 may provide means to solve the Wigner equation (i.e., equation (1)) and variations thereof in the optical domain without performing the repetitive calculations typically required to obtain a solution. Referring to FIG. 2, the photonic cyclic autocorrelation processor 200 may include a master laser 210, a first optical modulator 230, a dispersive element 240, a second optical modulator 250, and an optical comb filter 260. The master laser 210 may be, for example, but not limited to, a low-linewidth semiconductor laser or other laser. The master laser 210 may generate a self-referenced optical frequency comb signal 220 having different optical wavelengths (i.e., colors, or tones). The tones of the optical frequency comb signal 220 may be modulated at the first optical modulator 230 by an input signal x(t) 225, for example, a radio frequency (RF) signal or other signal, received by a first receiver (not shown). The first optical modulator 230 may generate N spectral copies 235 of the input signal x(t) 225 on the tones of the optical frequency comb signal 220.

The N spectral copies 235 of the input signal x(t) 225 may be sent to the dispersive element 240. The dispersive element 240 may be an optical fiber dispersive element, for example, but not limited to, a single mode fiber or other dispersive element. The dispersive element 240 may generate wavelength-dependent time delays, $\tau_k$, between adjacent spectral copies of the input signal x(t) 225. The time delays correspond to phase shifts in the frequency domain. The delayed spectral copies (i.e., $x(t-\tau_1) \ldots x(t-\tau_N)$) 245 of the input signal x(t) 225 may be sent to the second optical modulator 250.

The second optical modulator 250 may modulate the delayed spectral copies 245 of the input signal x(t) 225 with a conjugate x*(t) 227 of the input signal x(t) 225. The second optical modulator 250 may generate conjugate modulated spectral copies (i.e., $x^*(t)x(t-\tau_1) \ldots x^*(t)x(t-\tau_N)$) 255 of the delayed spectral copies 245. The conjugate modulation of the delayed spectral copies 245 of the input signal x(t) 225 results in the practical generation of the terms $$x\left(t - \frac{\tau}{2}\right) x^*\left(t + \frac{\tau}{2}\right)$$

from equation (1) that are integrated to obtain the cyclic autocorrelation coefficients.

The conjugate modulated spectral copies 255 may be sent to the optical comb filter 260. The optical comb filter 260 may be, for example, but not limited to, a fine resolution etalon or other optical comb filter. The optical comb filter 260 may perform the integration of the conjugate modulated spectral copies 255 to produce integrated conjugate modulated spectral copies 265 corresponding to the cyclic autocorrelation coefficients for all time delays $\tau_k$. For example, as illustrated in FIG. 2, the N-th integrated conjugate modulated spectral copy 266 may have a complete set of cyclic autocorrelation coefficients $R_x^{\alpha_i}(\tau_N)$ corresponding to $\tau_N$ delay at each cyclic frequency $\alpha_i$, where i=1, 2, ... N. Consequently, a full complement of N integrated spectral copies will form a complete cyclic autocorrelation table, eliminating a need for full-rate FFT computations in either photonic or electronic domains.

In some embodiments, the conjugate modulated spectral copies 255 may be modulated again with the delayed version of the input signal 225 and then passed through the comb filter 260 to generate computation-free higher order cumulants (i.e., higher-order cyclic autocorrelation coefficients). The cyclic autocorrelation function, which is a second order process, can discriminate cyclostationary signals contaminated with high level noise. There are, however, exceptional signal modulation formats that are immune to second order processes such as spectral correlation or cyclic autocorrelation. Signals having these types of modulation formats are specially synthesized to be concealed from cyclostationary receivers. Higher order processes such as third other cumulant analysis can extract those types of signals out of noise. However, the processing complexity increases approximately quadratically with the order of the process; therefore, higher order cumulants are difficult to generate with electronics even for low bandwidth signals.

Figure 3:
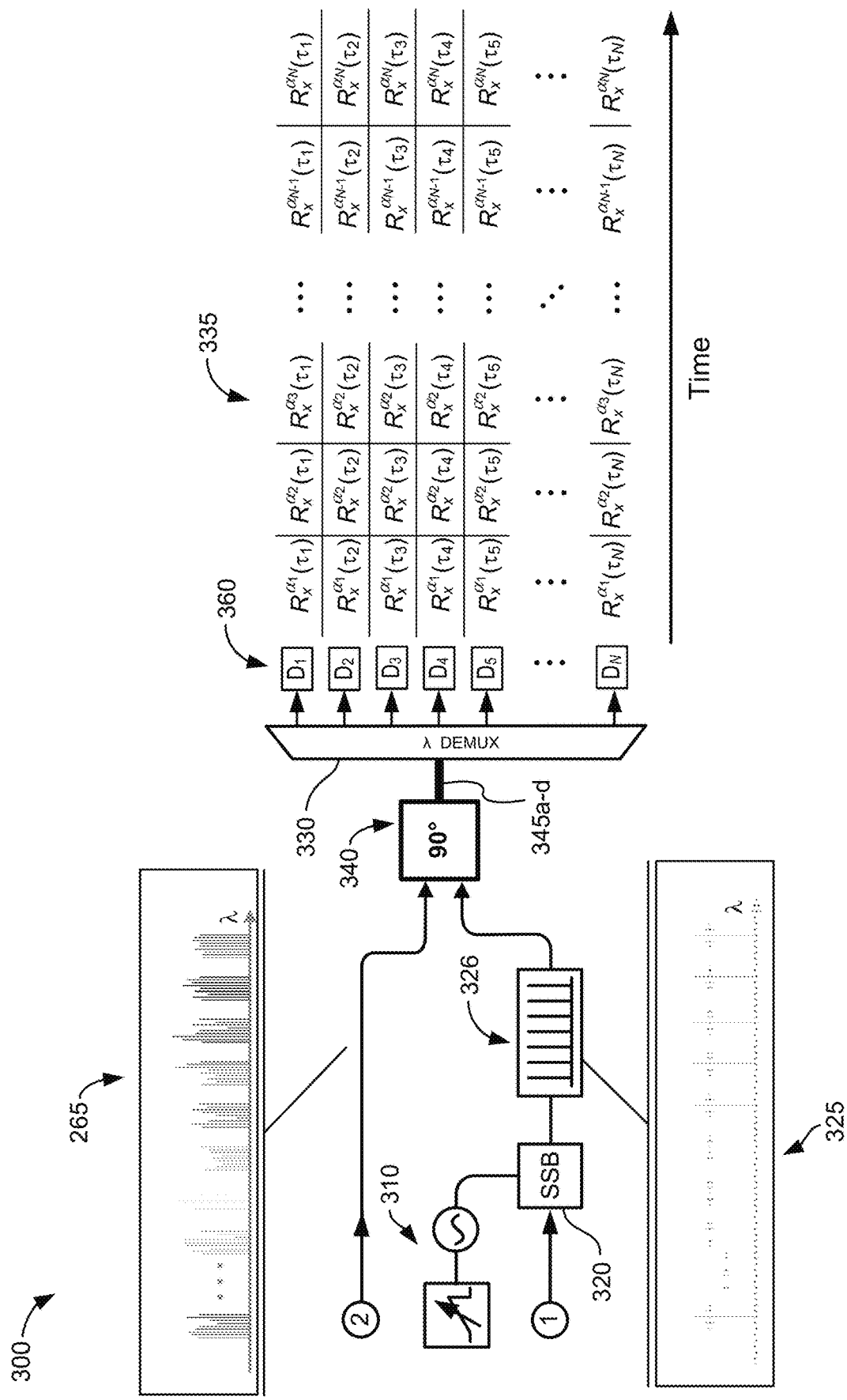
FIG. 3 is a block diagram of a cyclic autocorrelation coefficients readout circuit in accordance with various aspects of the present disclosure.

FIG. 3 is a block diagram of a cyclic autocorrelation coefficients readout circuit 300 in accordance with various aspects of the present disclosure. Referring to FIG. 3, the readout circuit 300 may include a radio frequency (RF) oscillator 310, a third optical modulator 320, for example, a single side band (SSB) modulator or other modulator, an optical wavelength demultiplexer 330, a 90° hybrid optical module 340, and a plurality of detectors $D_1$-$D_N$ 360. The plurality of detectors $D_1$-$D_N$ 360 may be coherent receivers. The RF oscillator 310 may generate a swept frequency. The signal generated by the master laser 210 and the swept frequency generated by the RF oscillator 310 may be input to the third optical modulator 320.

The third optical modulator 320 may shift the signal generated by the master laser 210 in frequency, for example, by several gigahertz or another amount, this frequency shifted signal may be used to generate the second optical frequency comb signal 326. The second optical frequency comb signal 326 may have the same frequency pitch as the original frequency comb 220 used to spectrally clone the input signal 225; however, the comb teeth of the second optical frequency comb signal 326 may be sweeping by several gigahertz following the swept RF oscillation 310. The generated frequency comb may be referred to herein as swept optical sampling signals 325. The swept optical sampling signals 325 may sweep at a lower rate than the frequency of the master laser signal, for example, a frequency of approximately 25 kHz or another frequency.

The swept optical sampling signals 325 and the integrated conjugate modulated spectral copies 265 may be combined by the 90° hybrid optical module 340. The 90° hybrid optical module 340 may act as a coherent receiver and output four signals: a modulated signal plus local oscillator signal 345a, a modulated signal minus local oscillator signal 345b, a modulated signal plus conjugate of local oscillator signal 345c, and a modulated signal minus conjugate of local oscillator signal 345d. The output signals of the hybrid optical module 340 may be input to the optical wavelength demultiplexer 330.

The optical wavelength demultiplexer 330 may include a plurality of demultiplexer modules. In some implementations, four demultiplexer modules may be used. Each demultiplexer module may be configured to demultiplex one output 345a-d of the hybrid optical module 340. The demultiplexed signals may be detected by the plurality of detectors 360. The plurality of detectors $D_1$-$D_N$ 360 may be coherent detectors. In some embodiments, each coherent detector may include two balanced detectors, with each balanced detector having two PIN diodes (i.e., a total of four PIN diodes for each coherent detector). Each of the plurality of detectors $D_1$-$D_N$ 360 receives a signal from each of the plurality of demultiplexer modules. For example, for implementations using four demultiplexer modules, each detector $D_1$-$D_N$ receives a signal from each demultiplexer module, i.e., each detector $D_1$-$D_N$ receives four signals.

Each of the detectors $D_1$-$D_N$ may coherently detect cyclic autocorrelation coefficients for all time delays $\tau_k$ of an associated tone from the integrated conjugate modulated spectral copies 265. The detectors $D_1$-$D_N$ may simultaneously stream the coefficients such that the $R_x^{\alpha_1}(\tau_1)$, $R_x^{\alpha_1}(\tau_2)$, ... $R_x^{\alpha_1}(\tau_N)$ coefficients are detected at the same time, the $R_x^{\alpha_2}(\tau_1)$, $R_x^{\alpha_2}(\tau_2)$, ... $R_x^{\alpha_2}(\tau_N)$ are streamed simultaneously after the $R_x^{\alpha_1}(\tau_1)$, $R_x^{\alpha_1}(\tau_2)$, ... $R_x^{\alpha_1}(\tau_N)$ coefficients, etc. The detectors $D_1$-$D_N$ may output the detected cyclic autocorrelation coefficients 335 as a function of time. The detected cyclic autocorrelation coefficients 335 may be digitized, for example using an analog-to digital (A/D) converter, and the spectral correlation function calculated.

Figure 4:
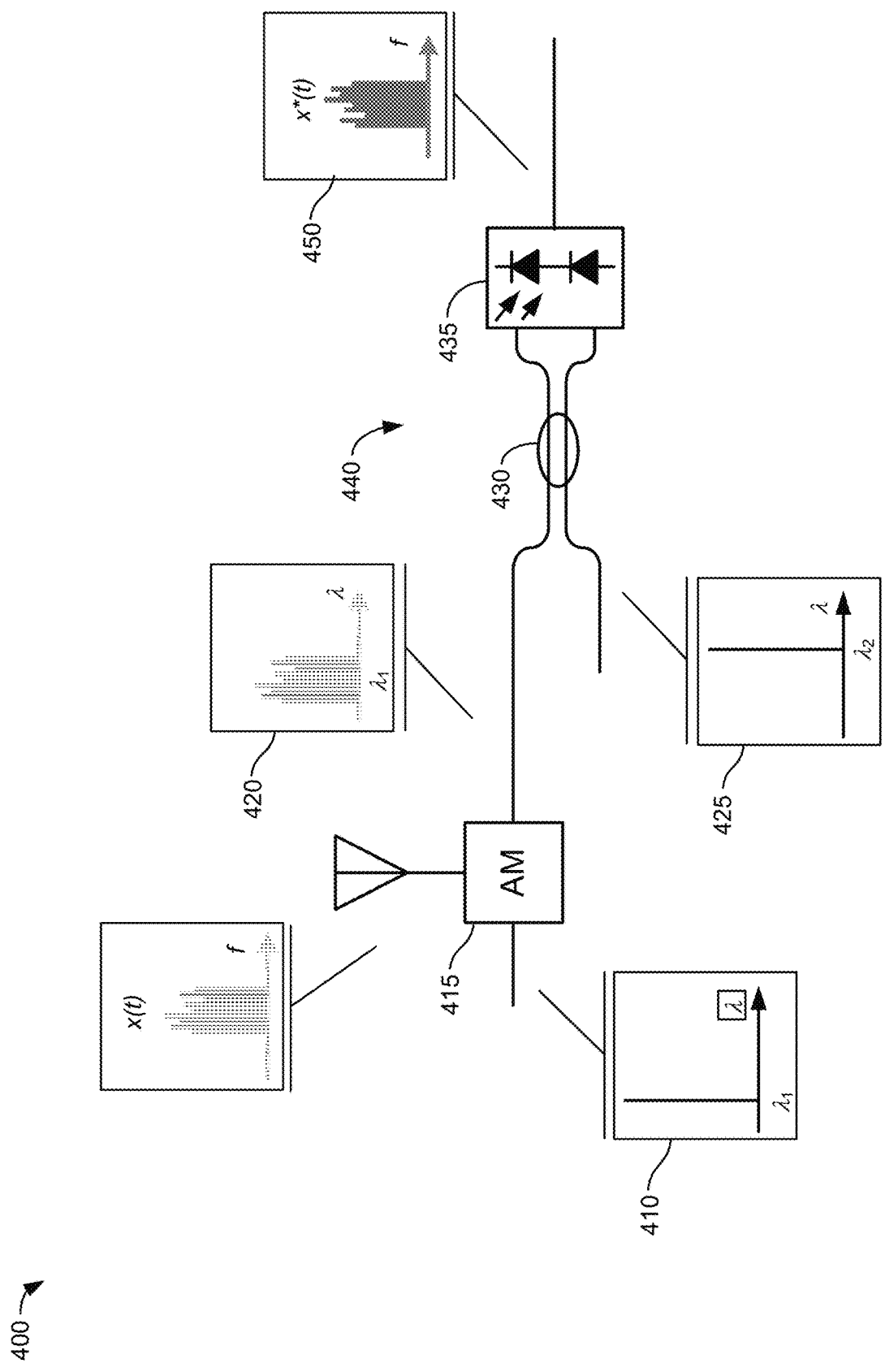
FIG. 4 is a block diagram of a signal conjugate generator in accordance with various aspects of the present disclosure.

FIG. 4 is a block diagram of a signal conjugate generator 400 included in the photonic cyclic autocorrelation processor 200 in accordance with various aspects of the present disclosure. Referring to FIG. 4, the conjugate generator 400 may include a fourth modulator 415, and a single quadrature coherent receiver 440. The single quadrature coherent receiver 440 may include a directional coupler 430 and a balanced photodiode 435. The desired RF signal x(t) may be imprinted on a reference optical carrier 410 at certain wavelength (i.e., $\lambda_1$) using the fourth modulator 415 to generate a modulated signal 420. A second optical carrier 425 at a shifted wavelength may be used as a local oscillator to coherently detect the modulated signal 420 at an up-converted frequency and generate the signal conjugate x*(t) 450. One of ordinary skill in the art will appreciate that other configurations for a conjugate generator may be used without departing from the scope of the present disclosure.

Figure 5:
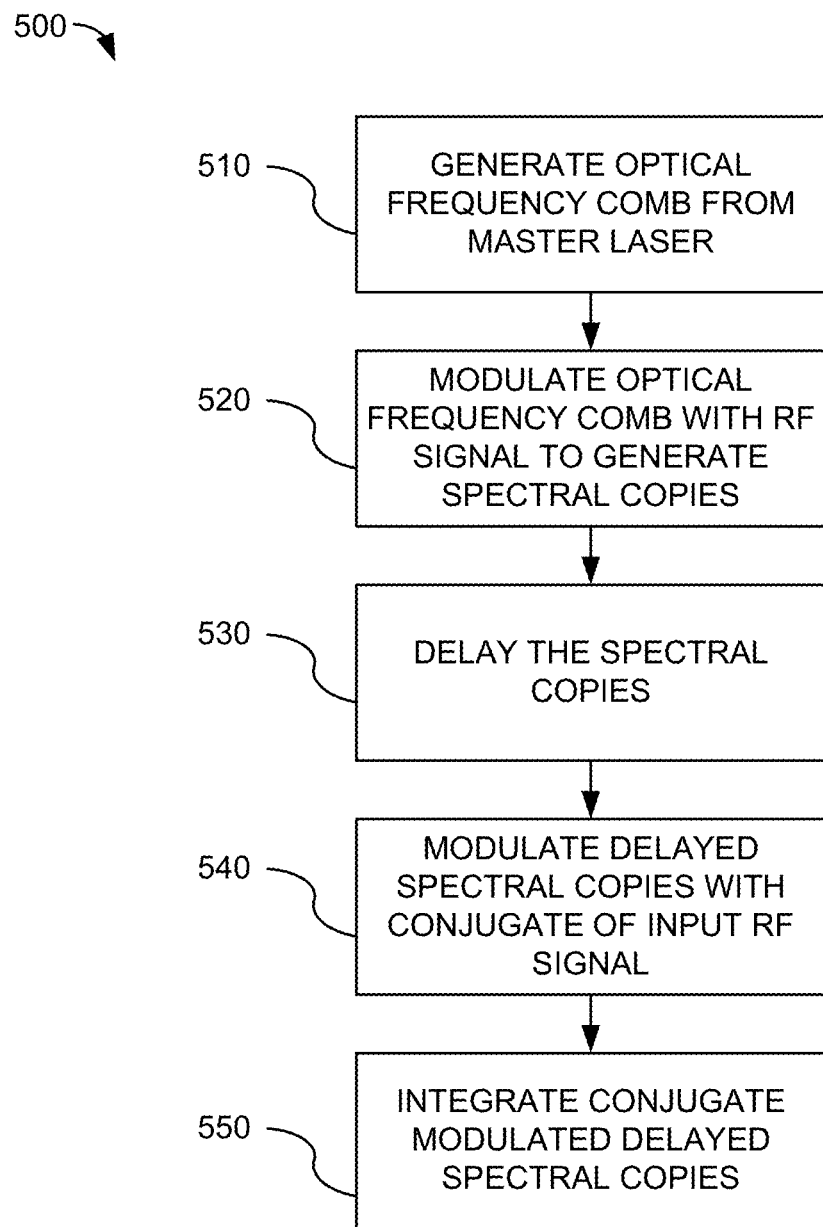
FIG. 5 is a flowchart of a method for generating cyclic autocorrelation coefficients in accordance with various aspects of the present disclosure.

FIG. 5 is a flowchart of a method 500 for generating cyclic autocorrelation coefficients in accordance with various aspects of the present disclosure. Referring to FIG. 5, at block 510 an optical frequency comb signal may be generated. For example, the master laser 210 may generate a self-referenced optical frequency comb signal 220. At block 520, the tones of the optical frequency comb signal may be modulated with an RF signal. For example, the tones of the optical frequency comb signal 220 may be modulated at the first optical modulator 230 by an input signal x(t) 225 received by a first receiver (not shown). The first optical modulator 230 may generate N spectral copies 235 of the input signal x(t) 225 on the tones of the optical frequency comb signal 220.

At block 530, the spectral copies of the input signal may be delayed. For example, the N spectral copies 235 of the input signal may be sent to the dispersive element 240. The dispersive element 240 may generate wavelength-dependent time delays, $\tau_k$, between adjacent spectral copies 235 of the input signal. At block 540, the delayed spectral copies of the input signal may be modulated with the conjugate of the RF signal. For example, the delayed spectral copies 245 of the input signal x(t) 225 may be sent to the second optical modulator 250. The second optical modulator 250 may modulate the delayed spectral copies 245 with a conjugate x*(t) 227 of the input signal x(t) 225. The second optical modulator 250 may generate conjugate modulated spectral copies 255 of the delayed spectral copies 245.

At block 550, the conjugate modulated delayed spectral copies may be integrated. For example, conjugate modulated spectral copies 255 may be sent to the optical comb filter 260. The optical comb filter 260 may perform the integration of the conjugate modulated delayed spectral copies 255 to produce integrated conjugate modulated delayed spectral copies 265 corresponding to the cyclic autocorrelation coefficients $R_x^{\alpha_i}(\tau_k)$ for all time delays $\tau_k$. A full complement of N integrated spectral copies will form a complete cyclic autocorrelation table.

It should be appreciated that the specific steps illustrated in FIG. 5 provide a particular method of generating cyclic autocorrelation coefficients according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
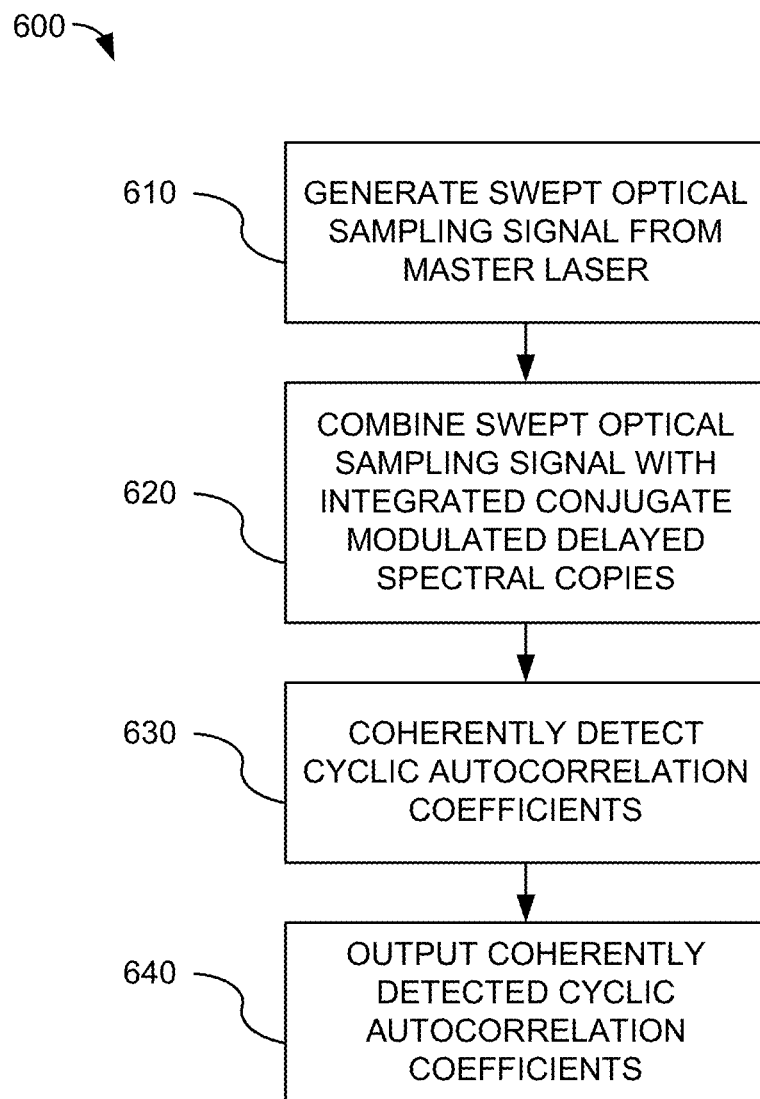
FIG. 6 is a flowchart of a method for reading out cyclic autocorrelation coefficients in accordance with various aspects of the present disclosure.

FIG. 6 is a flowchart of a method 600 for reading out cyclic autocorrelation coefficients in accordance with various aspects of the present disclosure. Referring to FIG. 6, at block 610 swept optical sampling signals may be generated. For example, the signal generated by the master laser 210 and the swept frequency generated by the RF oscillator 310 may be input to the third optical modulator 320. The third optical modulator 320 may shift the signal generated by the master laser 210 to produce a second optical frequency comb signal 326 and the swept optical sampling signals 325.

At block 620, the swept optical sampling signals may be combined with the integrated conjugate modulated delayed spectral copies of the input signal. For example, the swept optical sampling signals 325 and the integrated conjugate modulated delayed spectral copies 265 may be combined by the 90° hybrid optical module 340 such that each of the swept optical sampling signals 325 samples the corresponding integrated conjugate modulated delayed spectral copy 265. The output of the 90° hybrid optical module 340 may be input to the optical wavelength demultiplexer 330. At block 630, the cyclic autocorrelation coefficients may be detected. For example, each of the detectors $D_1$-$D_N$ may coherently detect the cyclic autocorrelation coefficients for all time delays $\tau_k$ of an associated tone from the integrated spectral copies 265. At block 640, the detectors $D_1$-$D_N$ may output the detected cyclic autocorrelation coefficients 335.

It should be appreciated that the specific steps illustrated in FIG. 6 provide a particular method of reading out cyclic autocorrelation coefficients according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

The methods 500 and 600, respectively, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 7:
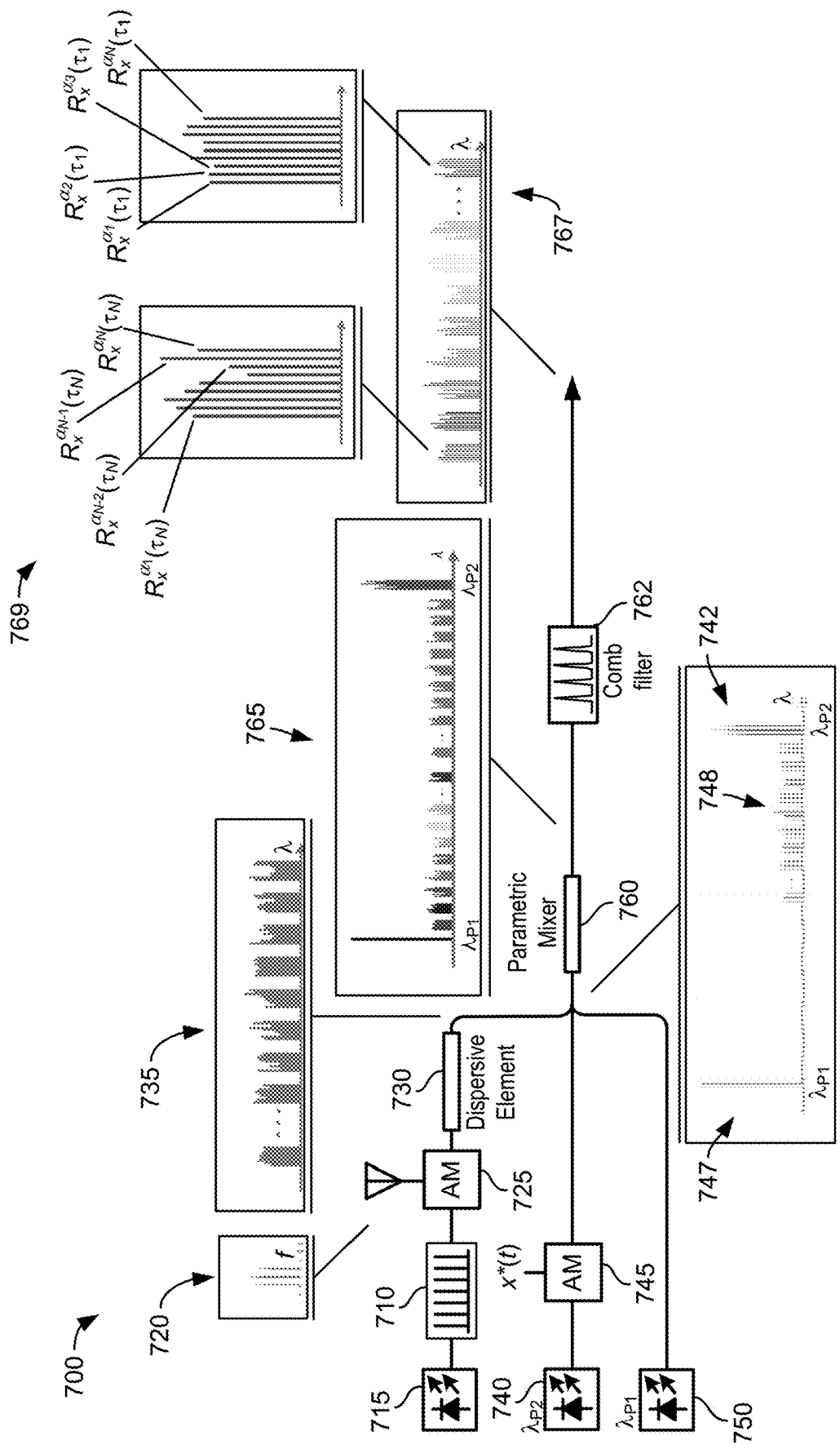
FIG. 7 is a block diagram of a two pumps parametric mixer embodiment of a photonic assisted cyclic autocorrelation processor in accordance with various aspects of the present disclosure.

FIG. 7 is a block diagram of a two pumps parametric mixer embodiment 700 of a photonic assisted cyclic autocorrelation processor in accordance with various aspects of the present disclosure. Referring to FIG. 7, comb tones 710 generated by a first laser 715 may be first modulated by the input signal x(t) 720 by a first optical modulator 725 to generate N spectral copies of the input signal x(t) 720. The N spectral copies of the input signal x(t) 720 may be sent to a dispersive medium 730 to generate wavelength-dependent delays $\tau_k$ between adjacent copies 735.

A second optical modulator 745 may modulate a first optical signal from a first blue pump 740 by the conjugate x*(t) of the input signal to serve as the first pump seeds for a two-pumps parametric mixer 760. A second optical signal from a second red pump 750 may be sent as a continuous wave (CW) second pump into the two-pumps parametric mixer 760. The two-pumps parametric mixer 760 may be a nonlinear optical material. In presence of high intensity light power (i.e., the pumps) and phase matching conditions the nonlinear optical material may generate a four wave mixing process that leads to idler waves generation. The two-pumps parametric mixer 760 receives the delayed spectral copies 748 as an inner-band input signal and generates an output signal 765 that is a combination of the parametrically amplified delayed spectral copies 735 and a newly generated idler wavelength band created as a product of the two pumps 742,747, and the parametrically amplified delayed spectral copies 735 optical fields.

The output of the parametric mixer 760 may be sent to the optical comb filter 762. The optical comb filter 762 may be, for example, but not limited to, a fine resolution etalon or other optical comb filter. The optical comb filter 762 may integrate the idler waves generated at the output of the parametric mixer 760. After processing by the parametric mixer 760, only the newly created idler waves, which are the product terms in the equation (1), are important. The other waves (i.e., the pumps and the delayed signal copies) may be filtered out. Since the idler waves are the results of the product of the two pumps and the delayed signal copies, the one CW pump is constant and has no effect. The other pump carries the conjugate of the input signal that is multiplied by the delayed signal copies. As a result, the k-th idler wavelength 769 of the output signal 767 from the comb filter 762 has a complete set of cyclic autocorrelation coefficients $R_x^{\alpha_i}(\tau_k)$, corresponding to $\tau_k$ delay, where i=1, 2, . . . N. Consequently, a full complement of N idler wavelength copies will form a complete cyclic autocorrelation table, eliminating a need for full-rate FFT in either photonics or electronic domains.

In accordance with various aspects of the present disclosure, the second optical signal from the second red pump 750 may also be modulated to generate computation-free cumulants (i.e., higher-order cyclic autocorrelation coefficients). As an example, if the second red pump 750 is modulated by $x(t-t_k)$, the resulting product series will be composed of $x(t-\tau_k)x^*(t)x(t-\tau_1)$ terms. Modulation of the second optical signal from the second red pump 750 may result in a third order process, rather than a second order process, for the product of the delayed signal and the conjugate of the input signal.

One of ordinary skill in the art will appreciate that the Wigner function has many applications in addition to determining the cyclic autocorrelation function, for example, but not limited to, determining a cross-ambiguity function (CAF), as well as applications to other aspects of signal processing, quantum physics, etc. The Wigner function is a general technique for time-frequency analysis of signals or equivalently position-momentum analysis. Various applications of the Wigner function will benefit from its determination using the reduced computation optical embodiments of the present disclosure.

Figure 8:
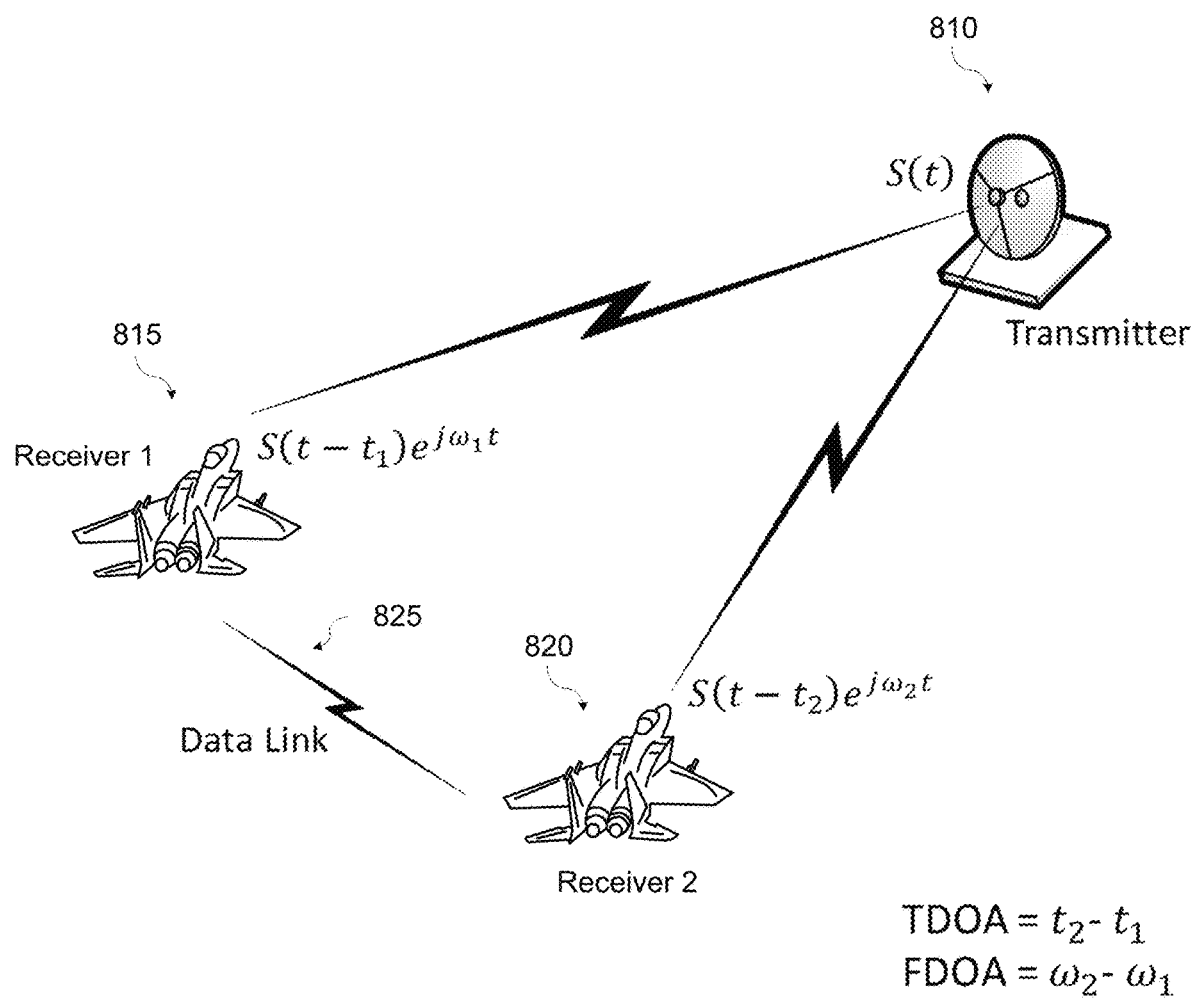
FIG. 8 is a diagram illustrating an example application of the cross-ambiguity function in accordance with various aspects of the present disclosure.

In one example, the CAF may be used to determine a location and/or velocity of a radio frequency transmitter based on signals received from a transmitter by different collectors at different locations. The location of radio frequency transmitters is critical to numerous applications, for example, but not limited to, military aircraft operating in hostile areas. FIG. 8 is a diagram illustrating an application of the CAF in accordance with various aspects of the present disclosure. Referring to FIG. 8, a radio frequency transmitter 810, for example, but not limited to a radar transmitter, may transmit a signal S(t) to locate one or more targets, for example, one or more aircraft. The transmitted signal may be a target reflection of typical broadcast radiations such as television broadcast signals.

A first receiver 815 (e.g., a first aircraft) disposed at a first location may receive the signal S(t) transmitted by the transmitter 810 delayed by a first amount $t_1$ and having a first frequency $\omega_1$ (i.e., $S(t-t_1)e^{-j\omega_1 t}$), where $\omega_1=2\pi f_1 t$. A second receiver 820 (e.g., a second aircraft) disposed at a second location may receive the signal S(t) transmitted by the transmitter 810 delayed by a second amount $t_2$ and having a second frequency $\omega_2$ (i.e., $S(t-t_2)e^{-j\omega_2 t}$), where $\omega_2=2\pi f_2 t$. A data link 825 between the two receivers may enable both receivers to know the received signal characteristics. The CAF may be used to jointly compute the Time Difference of Arrival (TDOA), determined as the time difference $t_2-t_1$ of the received signals, and the Frequency Difference of Arrival (FDOA), determined as the frequency difference $\omega_2-\omega_1$ of the received signals, between two receivers to enable location of the transmitter. Geolocationing techniques such as this are referred to as passive-radar techniques.

Figure 9:
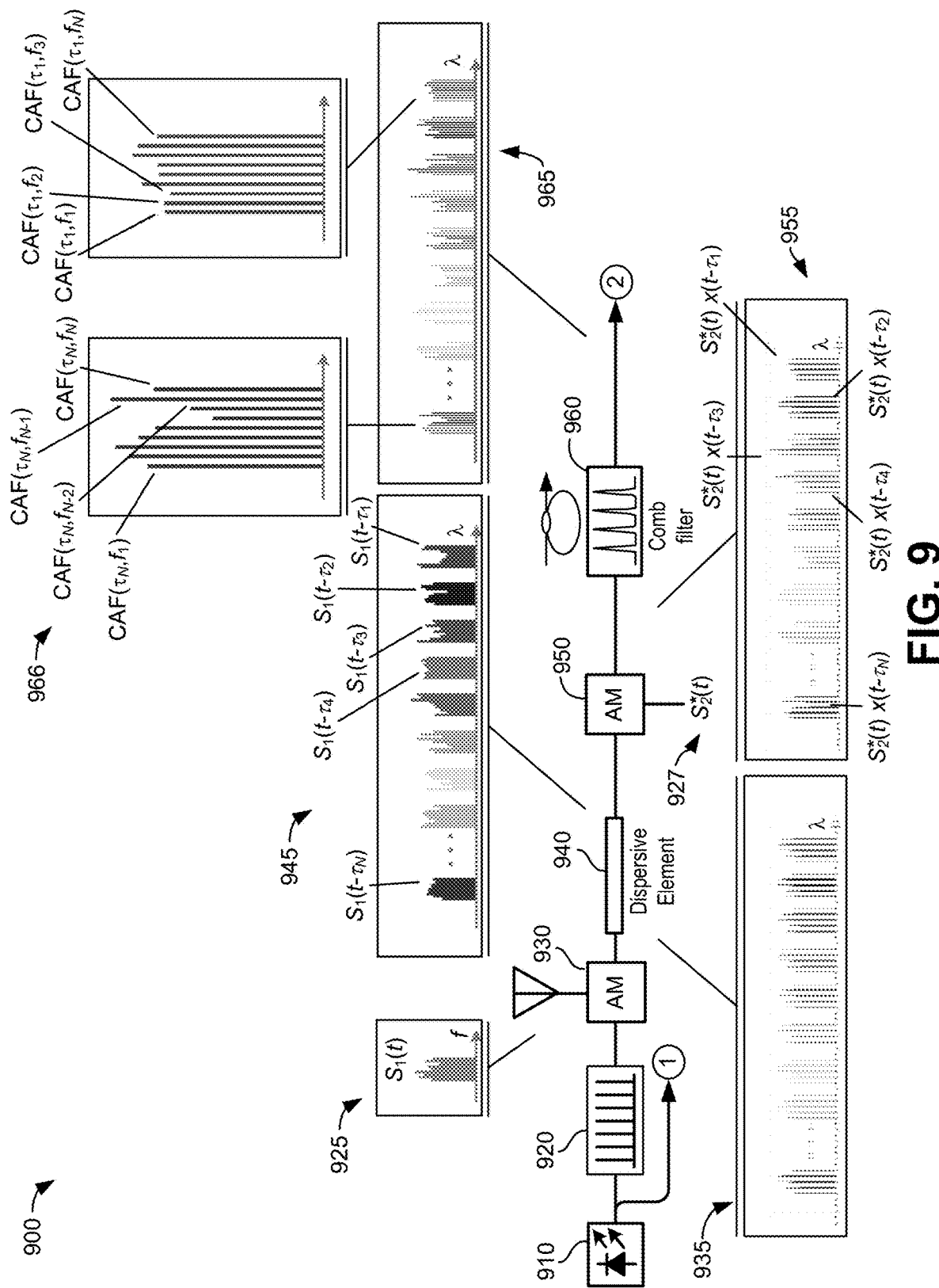
FIG. 9 is a block diagram of a photonic assisted cross-ambiguity correlation processor configured for determining a cross-ambiguity function in accordance with various aspects of the present disclosure.

FIG. 9 is a block diagram of a photonic assisted correlation processor 900 configured for determining a cross ambiguity function (CAF) in accordance with various aspects of the present disclosure. Many geolocation methods utilize the TDOA and FDOA between two receivers collecting the same transmission. One method of computing the TDOA and FDOA jointly is the cross ambiguity function (CAF). The cross ambiguity function is shown in equation (5):

$$CAF(\tau,f)=\int_{-\infty}^{\infty} S_1(t)S_2^*(t+\tau)e^{-j2\pi ft}dt \quad (5)$$

where $S_1$ and $S_2$ are signals received from a single transmission source through two separate receivers, $\tau$ is time delay, and f is the frequency difference. The magnitude of the CAF, or $|CAF(\tau,f)|$, will peak when $\tau$ and f are equal to the embedded TDOA and FDOA, respectively, between the two signals.

Referring to FIG. 9, the photonic assisted correlation processor 900 may include a master laser 910, a first optical modulator 930, a dispersive element 940, a second optical modulator 950, and an optical comb filter 960. The master laser 910 may be, for example, but not limited to, low-linewidth semiconductor laser or other lasers. The master laser 910 may generate a self-referenced optical frequency comb signal 920. Tones of the optical frequency comb signal 920 may be modulated at the first optical modulator 930 by a first signal $S_1$(t) 925, for example, a radio frequency (RF) signal or other signal, received by a first receiver (not shown). The first optical modulator 930 may generate N spectral copies 935 of the first signal $S_1$(t) 925 on the tones of the optical frequency comb signal 920.

The N spectral copies 935 of the first signal $S_1$(t) 925 may be sent to the dispersive element 940. The dispersive element 940 may be an optical fiber dispersive element, for example, but not limited to, a single mode fiber or other dispersive element. The dispersive element 940 may generate wavelength-dependent time delays, $\tau_k$, between adjacent spectral copies of the first signal $S_1$(t) 925. The time delays correspond to phase shifts in the frequency domain. The delayed spectral copies 945 of the first signal $S_1$(t) 925 may be sent to the second optical modulator 950.

The second optical modulator 950 may modulate the delayed spectral copies 945 of the first signal $S_1$(t) 925 with a conjugate $S_2^*$(t) 927 of a second signal received by a second receiver (not shown) from a same transmission source as the first signal $S_1$(t). The conjugate $S_2^*$(t) 927 of the second signal may be generated, for example, by the conjugate generator described with respect to FIG. 4 of the present disclosure or by another method. The second optical modulator 950 may generate conjugate modulated spectral copies 955 of the delayed spectral copies 945. The conjugate modulation of the delayed spectral copies 945 of the first signal $S_1$(t) 925 results in the practical generation of the terms $S_1(t)S_2^*(t+\tau)$ from equation (5) that are integrated to obtain the CAF correlation coefficients.

The conjugate modulated delayed spectral copies 955 may be sent to the optical comb filter 960. The optical comb filter 960 may be, for example, but not limited to, a fine resolution etalon or other optical comb filter. The optical comb filter 960 may perform the integration of the conjugate modulated delayed spectral copies 955 to produce integrated conjugate modulated delayed spectral copies 965 corresponding to the CAF correlation coefficients for all time delays $\tau_k$. For example, as illustrated in FIG. 9, the N-th integrated conjugate modulated delayed spectral copy 966 may have a complete set of CAF correlation coefficients $CAF(\tau_N, f_i)$ corresponding to $\tau_N$ delay, at each frequency $f_i$, where i=1, 2, . . . N. A full complement of N integrated spectral copies will form a complete CAF correlation table, eliminating a need for full-rate DFT in either photonic or electronic domains.

A readout circuit, for example, the readout circuit described with respect to FIG. 3, may optically demultiplex and coherently detect CAF correlation coefficients for all time delays $\tau_k$ of an associated tone from the integrated spectral copies. Operation of the readout circuit has been described with respect to FIG. 3 and so will not be repeated here. The detectors $D_1$-$D_N$ may output the detected CAF correlation coefficients as a function of time. The detected CAF correlation coefficients may be digitized, for example, using an A/D converter.

Figure 10:
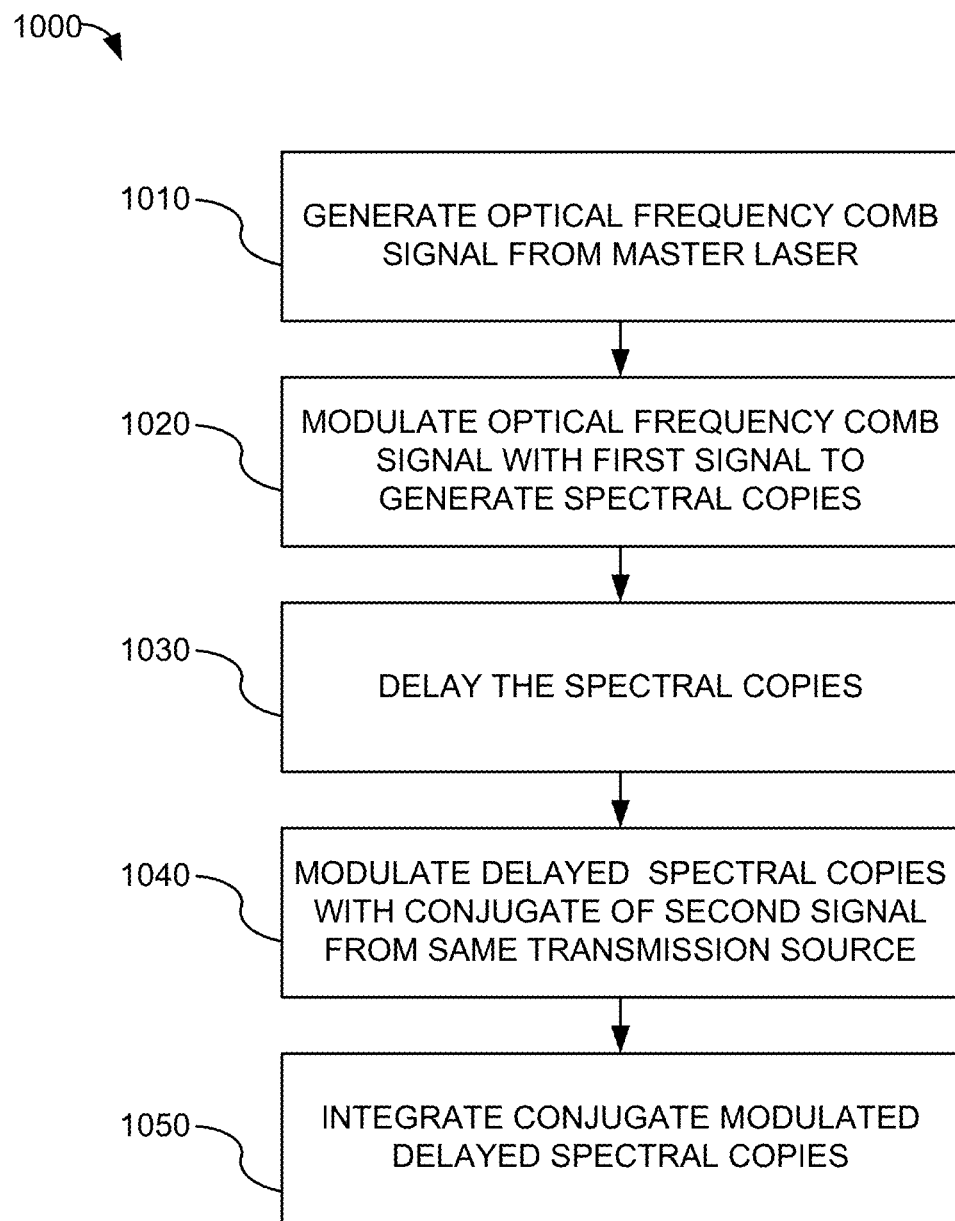
FIG. 10 is a flowchart of a method for generating cross-ambiguity correlation coefficients in accordance with various aspects of the present disclosure.

FIG. 10 is a flowchart of a method 1000 for generating cross-ambiguity function correlation coefficients in accordance with various aspects of the present disclosure. Referring to FIG. 10, at block 1010 an optical frequency comb signal may be generated. For example, the master laser 910 may generate a self-referenced optical frequency comb signal 920. At block 1020, the tones of the optical frequency comb signal may be modulated with a first RF signal. For example, the tones of the optical frequency comb signal 920 may be modulated at the first optical modulator 930 by a first signal $S_1$ (t) 925 received by a first receiver (not shown). The first optical modulator 930 may generate N spectral copies 935 of the first signal $S_1$ (t) 925 on the tones of the optical frequency comb signal 920.

At block 1030, the spectral copies of the first signal may be delayed. For example, the N spectral copies 935 of the first signal $S_1$(t) 925 may be sent to the dispersive element 940. The dispersive element 940 may generate wavelength-dependent time delays, $\tau_k$, between adjacent spectral copies 935 of the first signal $S_1$(t) 925. At block 1040, the delayed spectral copies of the first signal $S_1$(t) 925 may be modulated with a conjugate $S_2^*$(t) 927 of a second signal received by a second receiver (not shown) from a same transmission source as the first signal $S_1(t)$. For example, the delayed spectral copies 945 of the first signal $S_1(t)$ 925 may be sent to the second optical modulator 950. The second optical modulator 950 may modulate the delayed spectral copies 945 with a conjugate $S_2^*(t)$ 927 of a second signal received by a second receiver (not shown) from a same transmission source as the first signal $S_1(t)$. The second optical modulator 950 may generate conjugate modulated spectral copies 955 of the delayed spectral copies 945.

At block 1050, the conjugate modulated delayed spectral copies may be integrated. For example, conjugate modulated delayed spectral copies 955 may be sent to the optical comb filter 960. The optical comb filter 960 may perform the integration of the conjugate modulated delayed spectral copies 955 to produce integrated conjugate modulated delayed spectral copies 965 corresponding to the CAF correlation coefficients for all time delays $\tau_k$. For example, as illustrated in FIG. 9, the N-th integrated conjugate modulated delayed spectral copy 966 may have a complete set of CAF correlation coefficients $CAF(\tau_N, f_i)$ corresponding to $\tau_N$ delay, at each frequency $f_i$, where i=1, 2, . . . N. Consequently, a full complement of N integrated conjugate modulated delayed spectral copies will form a complete CAF correlation table.

It should be appreciated that the specific steps illustrated in FIG. 10 provide a particular method of generating cyclic autocorrelation coefficients according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
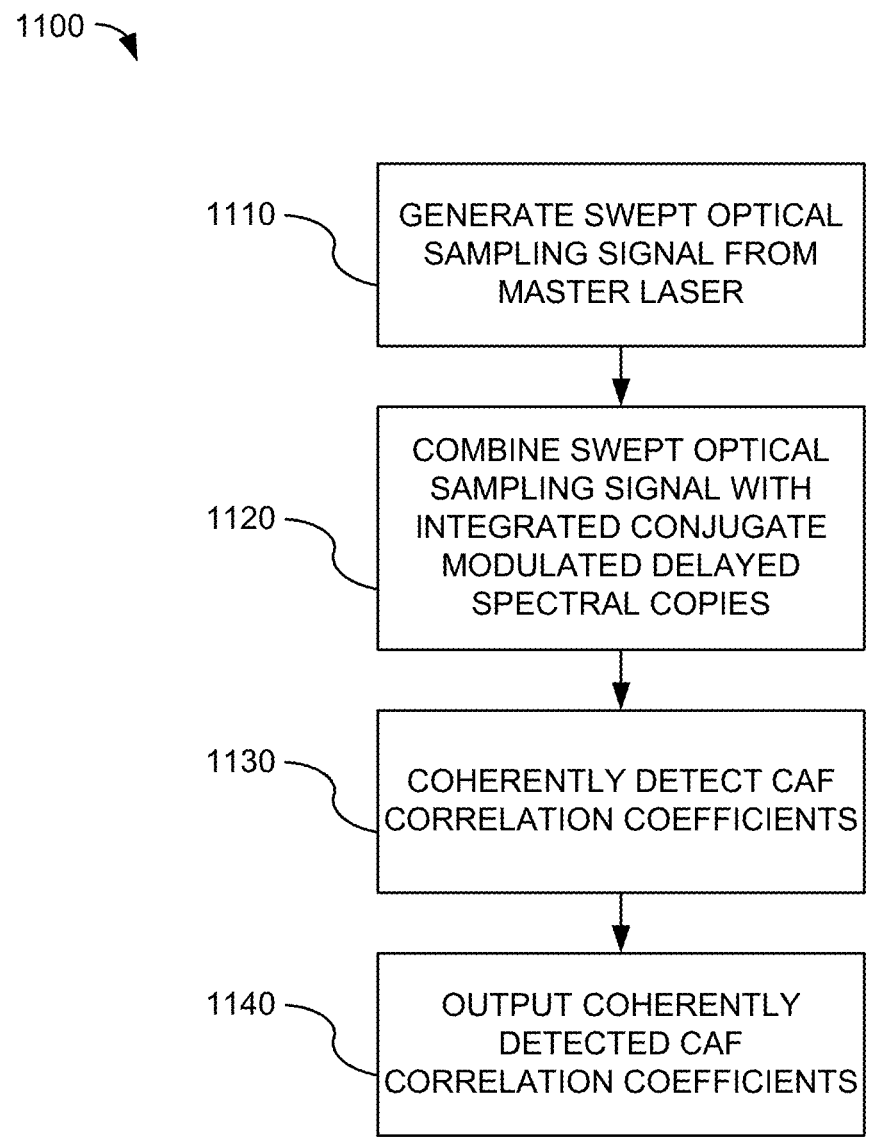
FIG. 11 is a flowchart of a method for reading out cross-ambiguity correlation coefficients in accordance with various aspects of the present disclosure.

FIG. 11 is a flowchart of a method 1100 for reading out cross-ambiguity correlation coefficients in accordance with various aspects of the present disclosure. The cross-ambiguity function correlation coefficients may be read out, for example, using the apparatus described with respect to FIG. 3. Referring to FIG. 11, at block 1110 swept optical sampling signals may be generated. For example, the signal generated by the master laser 910 and the swept frequency generated by the RF oscillator 310 may be input to the third optical modulator 320. The third optical modulator 320 may shift the signal generated by the master laser 910 to produce swept optical sampling signals 325.

At block 1120, the swept optical sampling signals may be combined with the integrated conjugate modulated delayed spectral copies of the input signal. For example, the swept optical sampling signals 325 and the integrated spectral copies 965 may be combined by the 90° hybrid optical module 340 such that each of the swept optical sampling signals 325 samples the corresponding integrated modulated delayed spectral copy 965. The output of the 90° hybrid optical module 340 may be input to the optical wavelength demultiplexer 330. At block 1130, the CAF correlation coefficients may be detected. For example, each of the detectors $D_1$-$D_N$ may coherently detect the CAF correlation coefficients for all time delays $\tau_k$ of an associated tone from the integrated modulated delayed spectral copies 965. At block 1140, the detectors $D_1$-$D_N$ may output the detected CAF correlation coefficients.

It should be appreciated that the specific steps illustrated in FIG. 11 provide a particular method of reading out CAF correlation coefficients according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

The methods 1000 and 1100, respectively, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 12:
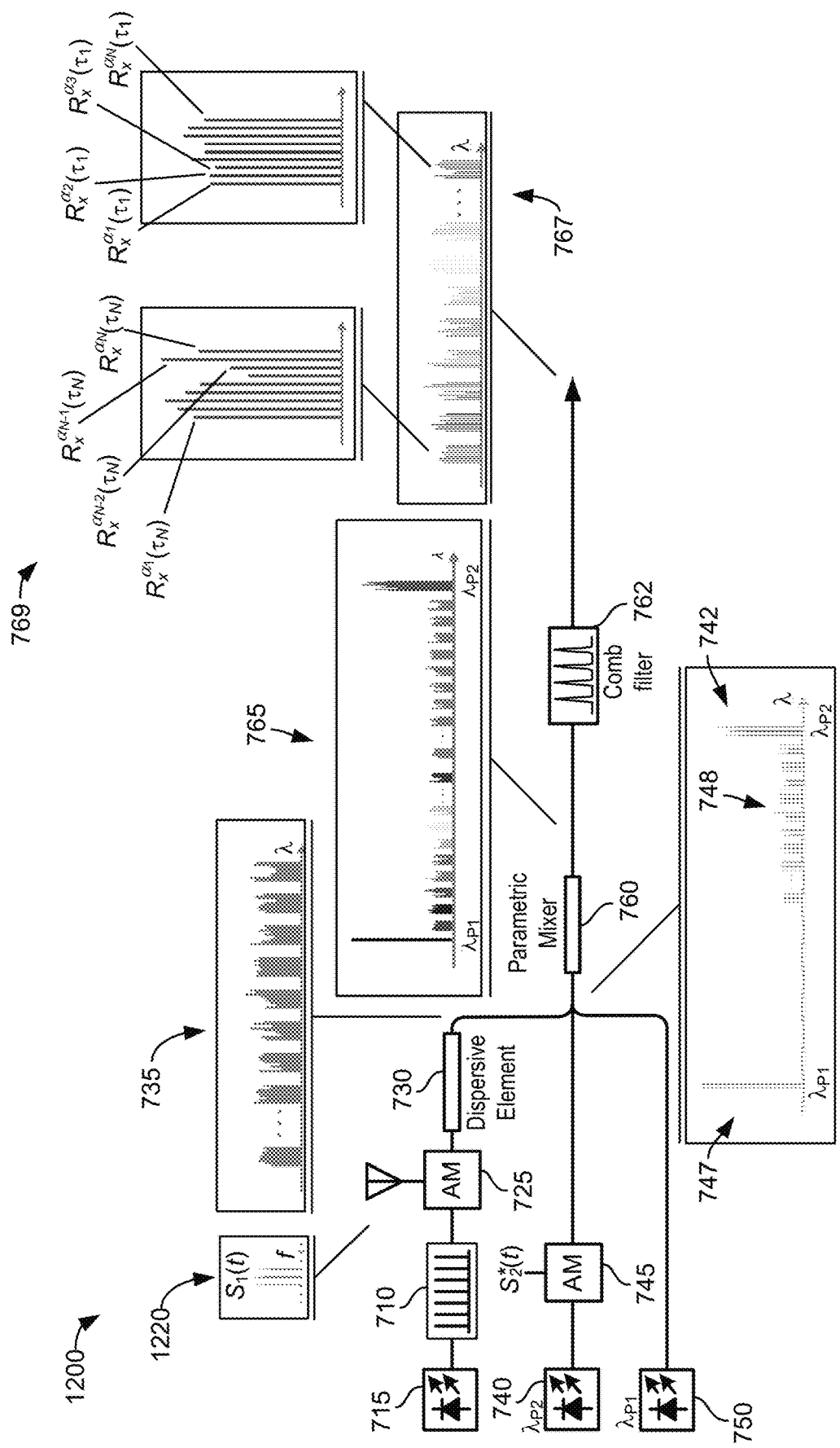
FIG. 12 is a block diagram of a two pumps parametric mixer embodiment 1200 of a photonic assisted cyclic autocorrelation processor configured for determining a cross ambiguity function (CAF) in accordance with various aspects of the present disclosure.

FIG. 12 is a block diagram of a two pumps parametric mixer embodiment 1200 of a photonic assisted cyclic auto-correlation processor configured for determining a cross ambiguity function (CAF) in accordance with various aspects of the present disclosure. The two pumps parametric mixer embodiment 1200 of FIG. 12 includes the elements of the two pumps parametric mixer embodiment 700 illustrated and described with respect to FIG. 7 and are numbered accordingly. The elements of the a two pumps parametric mixer embodiment 1200 of FIG. 12 operate in the same manner as the elements of the two pumps parametric mixer embodiment 700 of FIG. 7 and so will not be further described here.

Referring to FIG. 12, to calculate the CAF, tones of the optical frequency comb signal 710 may be modulated at the first optical modulator 725 by a first signal $S_1(t)$ 1220, for example, a radio frequency (RF) signal or other signal, received by a first receiver (not shown). The second optical modulator 745 may modulate the optical signal from the first blue pump 740 with a conjugate $S_2^*(t)$ of a second signal received by a second receiver (not shown) from a same transmission source as the first signal $S_1(t)$. The conjugate $S_2^*(t)$ 927 of the second signal may be generated, for example, by the conjugate generator described with respect to FIG. 4. Processing of the modulated signals by the embodiment 1200 of FIG. 12 is the same as the processing of the modulated signals explained with respect to the embodiment 700 of FIG. 7 and will not be further described here.

Figure 13:
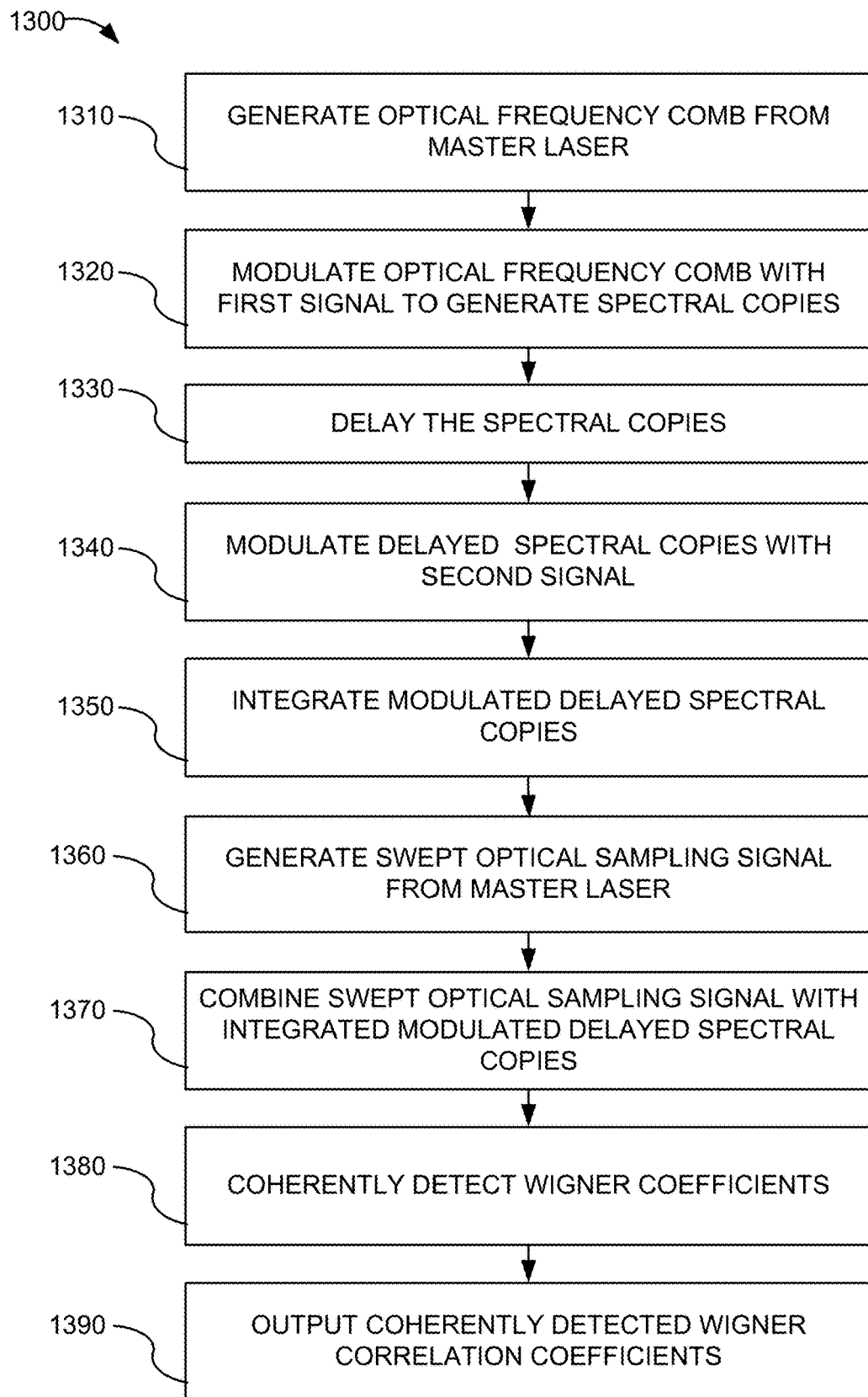
FIG. 13 is a flowchart of a method for generating and reading out Wigner function coefficients in accordance with various aspects of the present disclosure.

FIG. 13 is a flowchart of a method 1300 for generating and reading out Wigner function coefficients in accordance with various aspects of the present disclosure. The Wigner function coefficients may be generated, for example, using the apparatus described with respect to FIG. 9. The Wigner function coefficients may be read out, for example, using the apparatus described with respect to FIG. 3. Referring to FIG. 13, at block 1310 an optical frequency comb signal may be generated. For example, the master laser 910 may generate a self-referenced optical frequency comb signal 920. At block 1320, the tones of the optical frequency comb signal may be modulated with a first signal. For example, the tones of the optical frequency comb signal 920 may be modulated at the first optical modulator 930 by a first signal received by a first receiver (not shown). The first optical modulator 930 may generate N spectral copies 935 of the first signal on the tones of the optical frequency comb signal 920.

At block 1330, the spectral copies of the first signal may be delayed. For example, the N spectral copies 935 of the first signal may be sent to the dispersive element 940. The dispersive element 940 may generate wavelength-dependent time delays, $\tau_k$, between adjacent spectral copies 935 of the first signal. At block 1340, the delayed spectral copies of the first signal may be modulated with a second signal received by a second receiver (not shown). For example, the delayed spectral copies 945 of the first signal may be sent to the second optical modulator 950. The second optical modulator 950 may modulate the delayed spectral copies 945 with a second signal received by a second receiver (not shown). The second optical modulator 950 may generate conjugate modulated spectral copies 955 of the delayed spectral copies 945.

At block 1350, the modulated delayed spectral copies may be integrated. For example, modulated delayed spectral copies 955 may be sent to the optical comb filter 960. The optical comb filter 960 may perform the integration of the modulated delayed spectral copies 955 to produce integrated modulated delayed spectral copies 965 corresponding to the Wigner coefficients for all time delays $\tau_k$. For example, as illustrated in FIG. 9, the N-th integrated spectral copy 966 may have a complete set of Wigner coefficients corresponding to $\tau_N$ delay, at each frequency $f_i$, where i=1, 2, ... N. Consequently, a full complement of N integrated modulated delayed spectral copies will form a complete Wigner coefficient table.

At block 1360 swept optical sampling signals may be generated. For example, the signal generated by the master laser 910 and the swept frequency generated by the RF oscillator 310 may be input to the third optical modulator 320. The third optical modulator 320 may shift the signal generated by the master laser 910 to produce swept optical sampling signals 325.

At block 1370, the swept optical sampling signals may be combined with the integrated modulated delayed spectral copies of the input signal. For example, the swept optical sampling signals 325 and the integrated conjugate modulated delayed spectral copies 265 may be combined by the 90° hybrid optical module 340 such that each of the swept optical sampling signals 325 samples the corresponding integrated modulated delayed spectral copy 965. The output of the 90° hybrid optical module 340 may be input to the optical wavelength demultiplexer 330. At block 1380, the Wigner coefficients may be detected. For example, each of the detectors $D_1$-$D_N$ may coherently detect the Wigner coefficients for all time delays $\tau_k$ of an associated tone from the integrated modulated delayed spectral copies 965. At block 1390, the detectors $D_1$-$D_N$ may output the detected Wigner coefficients.

It should be appreciated that the specific steps illustrated in FIG. 13 provide a particular method of generating and reading out Wigner coefficients according to another embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

The method 1300 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

One of ordinary skill in the art will appreciate that other modifications to the apparatuses and methods of the present disclosure may be made for implementing various applications of the Wigner function without departing from the scope of the present disclosure.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. An apparatus for generating a set of cyclic autocorrelation coefficients of an input signal, the apparatus comprising:
   a master laser configured to generate an optical frequency comb signal;
   a first optical modulator configured to modulate the optical frequency comb signal with an input signal to generate a plurality of spectral copies of the input signal;
   a dispersive element configured to delay the plurality of spectral copies of the input signal by a wavelength-dependent time delay;
   a second optical modulator configured to modulate the delayed plurality of spectral copies with a conjugate of the input signal; and
   an optical comb filter configured to integrate the conjugate modulated delayed plurality of spectral copies of the input signal to generate the set of cyclic autocorrelation coefficients.

2. The apparatus of claim 1, wherein the first optical modulator and the second optical modulator comprise amplitude modulators.

3. The apparatus of claim 1, further comprising:
   a local oscillator configured to generate a swept frequency;
   a third optical modulator configured to modulate an optical signal generated by the master laser with the swept frequency from the local oscillator to generate swept optical sampling signals;
   a wavelength demultiplexer configured to combine the swept optical sampling signals and the integrated conjugate modulated delayed plurality of spectral copies of the input signal such that each of the swept optical sampling signals samples a corresponding integrated conjugate modulated delayed spectral copy of the input signal; and
   a plurality of detectors configured to detect the set of cyclic autocorrelation coefficients for all time delays of an associated tone from the integrated conjugate modulated delayed plurality of spectral copies of the input signal, and output the detected set of cyclic autocorrelation coefficients.

4. The apparatus of claim 3, wherein the third optical modulator is a single side band modulator.

5. The apparatus of claim 3, wherein the plurality of detectors are coherent receivers.

6. A method for generating a set of cyclic autocorrelation coefficients of an input signal, the method comprising:
   generating an optical frequency comb signal from an optical signal generated by a master laser;

generating a plurality of spectral copies of the input signal by modulating the optical frequency comb signal with the input signal;

delaying the plurality of spectral copies by a wavelength-dependent time delay;

modulating the delayed plurality of spectral copies with a conjugate of the input signal; and generating the set of cyclic autocorrelation coefficients by integrating the conjugate modulated delayed plurality of spectral copies of the input signal.

7. The method of claim 6, wherein the optical frequency comb signal and the delayed plurality of spectral copies are amplitude modulated.

8. The method of claim 6, further comprising:

generating a swept frequency;

modulating the optical signal generated by the master laser with the swept frequency to generate swept optical sampling signals;

combining the swept optical sampling signals and the integrated conjugate modulated delayed plurality of spectral copies of the input signal such that each of the swept optical sampling signals samples a corresponding integrated conjugate modulated delayed spectral copy of the input signal;

detecting the set of cyclic autocorrelation coefficients for all time delays of an associated tone from the integrated conjugate modulated delayed plurality of spectral copies of the input signal; and outputting the detected cyclic autocorrelation coefficients.

9. The method of claim 8, wherein the optical signal generated by the master laser is single side band modulated.

10. The method of claim 8, wherein detecting the set of cyclic autocorrelation coefficients comprises coherent detection.

11. An apparatus for generating coefficients for a Wigner function in an optical domain, the apparatus comprising:

a master laser configured to generate an optical frequency comb signal;

a first optical modulator configured to modulate the optical frequency comb signal with a first signal to generate a plurality of spectral copies of the first signal;

a dispersive element configured to delay the plurality of spectral copies of the first signal by a wavelength-dependent time delay;

a second optical modulator configured to modulate the delayed plurality of spectral copies with a second signal; and an optical comb filter configured to integrate the modulated delayed plurality of spectral copies of the first signal to generate a set of Wigner function coefficients.

12. The apparatus of claim 11, wherein the first optical modulator and the second optical modulator comprise amplitude modulators.

13. The apparatus of claim 11, wherein the second signal is a conjugate of the first signal, and the Wigner function is a cyclic autocorrelation function.

14. The apparatus of claim 11, wherein the second signal is a conjugate of a signal different from the first signal received from a same source as the first signal, and the Wigner function is a cross-ambiguity function.

15. The apparatus of claim 11, further comprising:

a local oscillator configured to generate a swept frequency;

a third optical modulator configured to modulate an optical signal generated by the master laser with the swept frequency from the local oscillator to generate swept optical sampling signals;

a wavelength demultiplexer configured to combine the swept optical sampling signals and the integrated modulated delayed plurality of spectral copies of the first signal such that each of the swept optical sampling signals samples a corresponding integrated modulated delayed spectral copy of the first signal; and a plurality of detectors configured to detect the set of Wigner function coefficients for all time delays of an associated tone from the integrated modulated delayed plurality of spectral copies of the first signal, and output the detected set of Wigner function coefficients.

16. The apparatus of claim 15, wherein the third optical modulator is a single side band modulator.

17. The apparatus of claim 15, wherein the plurality of detectors are coherent receivers.

* * * * *